United States Patent [19]
Sisk

[11] Patent Number: 4,848,396
[45] Date of Patent: Jul. 18, 1989

[54] CAST HOPPER TEE

[76] Inventor: David E. Sisk, R.R. 1, Box 340, Bonne Terre, Mo. 63628

[21] Appl. No.: 186,104

[22] Filed: Apr. 25, 1988

Related U.S. Application Data

[63] Continuation-in-part of Ser. No. 817,584, Jan. 10, 1986, Pat. No. Des. 297,678.

[51] Int. Cl.$^4$ .............................................. F16L 7/00
[52] U.S. Cl. ................................ 137/375; 137/561 A; 251/366
[58] Field of Search .......................... 137/375, 561 A; 285/156; 251/366

[56] References Cited

U.S. PATENT DOCUMENTS

| | | | |
|---|---|---|---|
| 1,860,346 | 5/1932 | Anderson | 285/156 |
| 2,228,857 | 1/1941 | Stephenson | 285/156 |
| 3,251,122 | 5/1966 | Botelen | 251/366 |
| 3,402,731 | 9/1968 | Martin | 137/375 |
| 3,654,008 | 4/1972 | Rogers et al. | 285/156 |
| 3,813,023 | 5/1965 | Morrison | 285/156 |
| 4,652,020 | 3/1987 | Gilroy | 285/156 |

FOREIGN PATENT DOCUMENTS 489602 1/1938 United Kingdom ................ 251/366

Primary Examiner—A. Michael Chambers
Attorney, Agent, or Firm—Paul M. Denk

[57] ABSTRACT

An integral one-piece hopper tee is disclosed as providing a generally vertically directed hollow pipe section having a laterally outwardly direct flange at an upper end thereof for attachment to the bottom of a hopper truck. At the other end of the vertical pipe section, a generally transversely extending hollow pipe section is provided, with the opposite free ends thereof capable of being attached to pipeline tubing, through which pneumatic unloading of product obtained in the hopper truck may be routed first through the vertically and horizontally directed pipe sections and then into the pipeline tubing. In the area of juncture between the generally vertically and horizontally directed pipe sections, smooth and uninterrupted internal transitional surfaces are provided to permit complete and continuous flow of product discharged from the hopper into the vertically directed pipe section, and subsequent flowing without impedance into the generally horizontally extending pipe section, for entry into pipeline tubing connected thereto. An inner molded lining having a low coefficient of friction conforming to the smooth and uninterrupted internal transitional surfaces may also be used.

6 Claims, 4 Drawing Sheets

CAST HOPPER TEE

CROSS-REFERENCE TO RELATED APPLICATION

This application is denominated as a continuation-in-part application of the design patent application having Ser. No. 817,584, filed on Jan. 10, 1986, now U.S. Pat. No. 297,678 issued 09/13/88.

BACKGROUND OF THE INVENTION

This invention relates to cast hopper tees, and more particularly, to integral one-piece cast hopper tees having smooth and uninterrupted internal transitional surfaces permitting complete and continuous flow of product therethrough, without contamination.

Large elongated hoppers or tank trailers are commonly used to transport bulk commodities such as industrial and food products from the supplier to the manufacturer, who then converts the bulk commodity into products for consumers. When the hopper or tank trailers reach the manufacturers plant, the bulk commodity is unloaded. Typically, this is done by pneumatically unloading the bulk commodity from the hopper into clean and sanitary pipe lines at the manufacturer's location. For this purpose, hopper tees are mounted to the discharge outlet of the hopper truck and transfer the bulk commodity by gravity flow or air pressure conveyor or vibration into a vertical pipe section of the hopper tee. The hopper tee vertical pipe section is connected to a transverse or horizontal pipe section allowing the outer ends thereof to be connected in the pneumatic pipeline tubing system of the manufacturer. Pneumatic conveying of the bulk commodity through the horizontal pipe section and the pipeline tubing is achieved by establishing a pressure differential in the pipeline system, as will be apparent.

Prior art hopper tees have been constructed by welding the vertical and horizontal pipe sections together, as shown for example, in the prior art drawing illustrations of this disclosure. With prior art hopper tees constructed in this manner, the welded areas of juncture leave rough and irregular internal wall surfaces, which impede the flow of the product or commodity through the hopper tee. More specifically, the welds in the area of juncture between the vertical and horizontal pipe sections of the hopper tee produce rough and irregular internal wall surfaces, which can substantially impede product flow. Also, hopper tees constructed in this manner unfortunately result in a much higher incidence of product hang up in the rough and irregular internal wall surface areas, causing product contamination. As can be appreciated, a potential problem exists with the manufacturer/user of the bulk commodity, if product hang-up, from a previous bulk commodity shipment, is released into the pipeline system of the manufacturer-/user. Sometimes, abrasive dry bulk commodities such as sand result in premature wear-through of the hopper tee, in the welded areas of juncture between the vertical and horizontal pipe sections. Furthermore, an abrasive bulk commodity, as said sand, may wear-through the entire hopper tee. That is why the hopper tee, as well as the piping used for unloading, are typically made from schedule 80 heavy steel, in order to hold-up to the abrasiveness of sand, or related materials. The aforementioned problems associated with rough and costly prior art hopper tees and in conveying abrasive materials, have been overcome by the present invention, as will be made apparent in the description that is to follow.

SUMMARY OF THE INVENTION

Among the several objects and features of this invention may be noted:

The provision of an integral one-piece hopper tee which provides even and constant product flow throughout the vertical and horizontal pipe sections of the said hopper tee;

The provision of such a hopper tee which eliminates problems associated with rough and irregular internal wall surfaces that cause potential product contamination with subsequent commodities unloaded through the hopper tee;

The provision of such a hopper tee which provides smooth uninterrupted internal transitional surfaces to permit complete and continuous flow of product discharged from a hopper truck or the like into the hopper vertical and horizontal pipe sections without impedance of the product;

The provision of such a hopper tee that also utilizes an abrasive-resistant coating, resultingly enabling the hopper tee to be made from lighter material;

The provision of such a hopper tee which is also available in straight through/gravity unloading at a desired location; and The provision of such a hopper tee which is substantially more economical than prior art designs, can be fabricated to precise tolerances, is lighter, requires little or no maintenance, and is more suitable in the environment intended for use than prior art hopper tees.

Briefly stated, an integral one-piece cast hopper tee of the present invention includes a first hollow pipe section having a laterally outwardly directed flange at an upper end thereof for attachment to the bottom of a hopper truck its operating discharge valve, or the like. The first hollow pipe section includes an internal cylindrical wall of predetermined diameter. A second hollow pipe section which extends generally transversely relative to the first hollow pipe section is integrally attached thereto at a lower end thereof. The second hollow pipe section extends on opposite sides of the first hollow pipe section and terminates at opposite free ends for attachment to pipeline tubing. The second hollow pipe section has an internal cylindrical wall of smaller predetermined internal diameter than the first hollow pipe section. An area of juncture is provided between the first and second hollow pipe sections having smooth and uninterrupted internal transitional surfaces which include first opposed internal curvilinear surfaces that merge into second opposed curvilinear wall surfaces. Each of the first opposed internal curvilinear wall surfaces extend from an uppermost inner midpoint of the second hollow pipe section and curve a predetermined distance downwardly and inwardly on opposite sides of the midpoint along the internal cylindrical wall of the second hollow pipe section and extend transversely across the second hollow pipe section. The second opposed internal curvilinear wall surfaces extend generally longitudinally along the second hollow pipe section for a predetermined distance and merge with outermost portions of the first opposed internal curvilinear wall surfaces. Thus, the area of juncture between the first and second hollow pipe sections provide smooth and uninterrupted internal transitional surfaces permitting complete and continuous flow of product discharged from the hopper into the first hollow pipe section in order to flow without impedance into the second hollow pipe section and then through the pipeline tubing. An inner molded lining having a low coefficient of friction may be used along the internal cylindrical walls including the smooth and uninterrupted internal transitional surfaces of the first and second hollow pipe sections. In another embodiment of the present invention, a separate swing-away door is mounted to a lower end of the first hollow pipe section which extends through the second hollow pipe section in order to enable product from the hopper to be deposited through the first hollow tube section by gravity flow to a desired location.

Other objects and features of this invention will become apparent from the description that is to follow.

BRIEF DESCRIPTION OF THE DRAWINGS

Corresponding reference characters indicate corresponding parts throughout the several views on the drawings.

DESCRIPTION OF THE PREFERRED EMBODIMENTS

Figure 1:
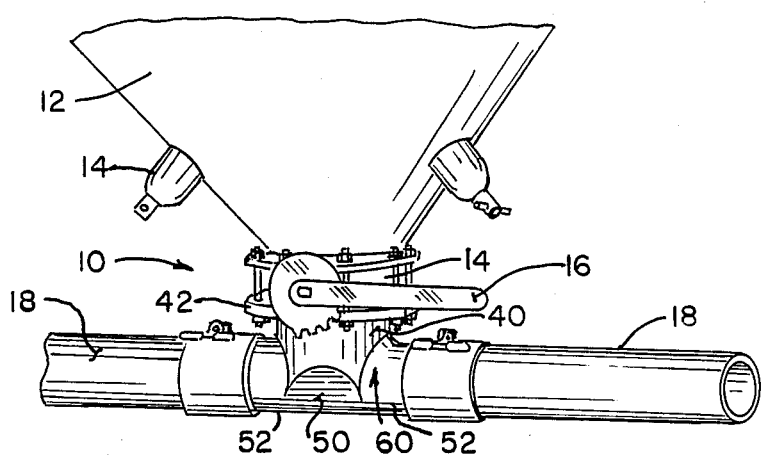
FIG. 1 is a fragmentary isometric view of the integral one-piece cast hopper tee constructed in accordance with the teachings of the present invention and shown as being connected to the discharge outlet of a hopper truck of the like for unloading commodities into a pipeline tubing system.

One of the principal areas of use of the cast hopper tee of the present invention is shown in FIG. 1 of the drawings. There, it will be seen that the integral one-piece cast hopper tee 10 is positioned adjacent and connected to the discharge outlet (not shown) of a hopper 12. The hopper 12 may form part of a hopper truck or the like and include vibrators 14 adjacent the discharge outlet (not shown) in order to loosen the bulk commodity contained within the hopper for discharge into the cast hopper tee 10. A valve 14 is preferably mounted to the lower end of the hopper 12 and includes a manually operable handle 16 for opening and closing a butterfly valve (not shown) or the like to open and close the discharge opening (not shown) of the hopper 12. The valve 14 is connected to the cast hopper tee 10, the construction of which will be described in detail, and pipeline tubing 18 is also connected to the cast hopper tee 10, in order to permit commodities within the hopper 12 to be discharged through the cast hopper tee 10 and then through the pipeline tubing, by way of pneumatic unloading, as will be readily understood.

Figure 10:
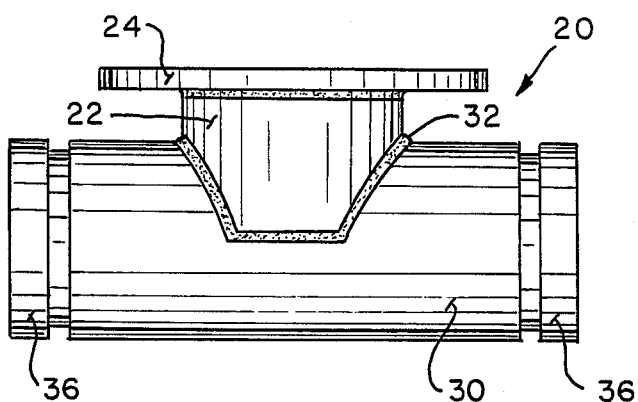
FIG. 10 is a side elevational view showing a prior art hopper tee having the vertical and horizontal hollow pipe sections thereof welded together as shown.
Figure 11:
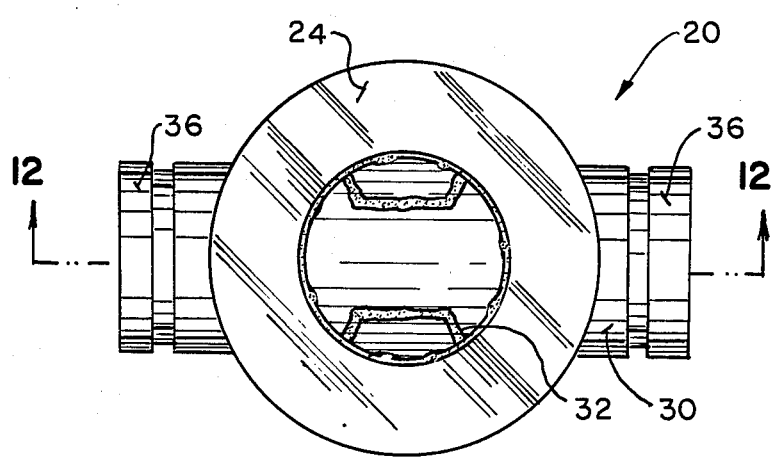
FIG. 11 is a top plan view of the prior art hopper tee shown in FIG. 10 and showing the rough and irregular internal wall surfaces thereof.
Figure 12:
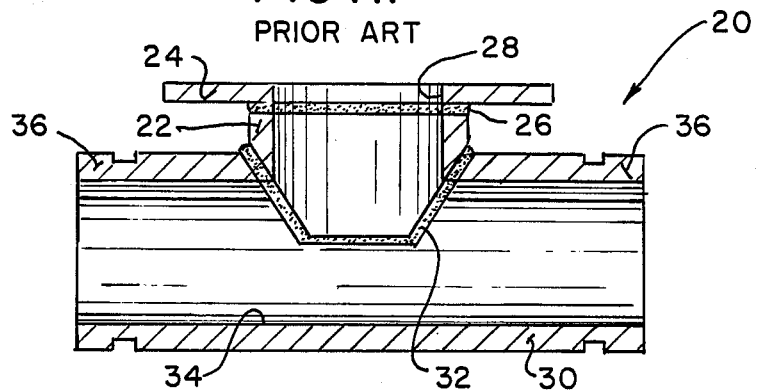
FIG. 12 is a sectional view of the prior art hopper tee as viewed along line 12—12 of FIG. 11, and further illustrating the manner in which the rough and irregular internal wall surfaces can impede product flow and cause product contamination.
Figure 13:
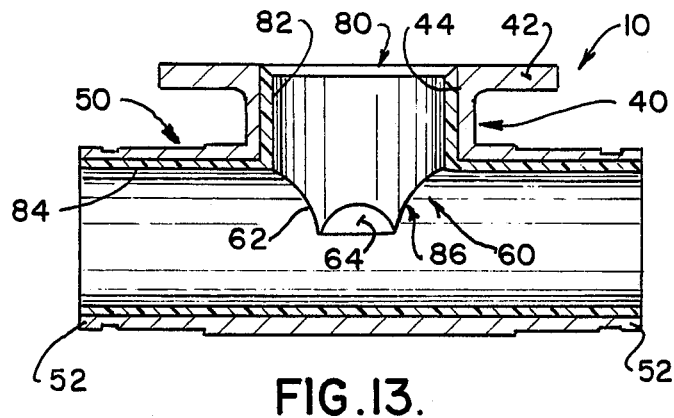
FIG. 13 is a side sectional view of a cast hopper tee employing an inner molded lining as viewed along lines 13—13 of FIG. 16.
Figure 14:
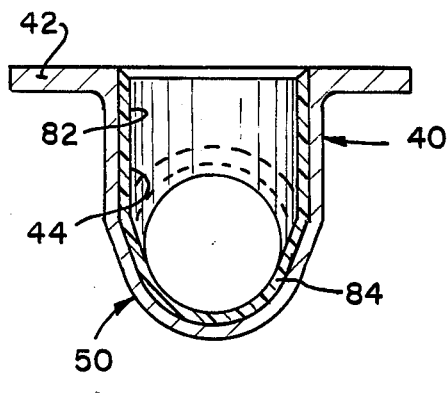
FIG. 14 is an end sectional view of the cast hopper tee as viewed along lines 14—14 of FIG. 16.
Figure 15:
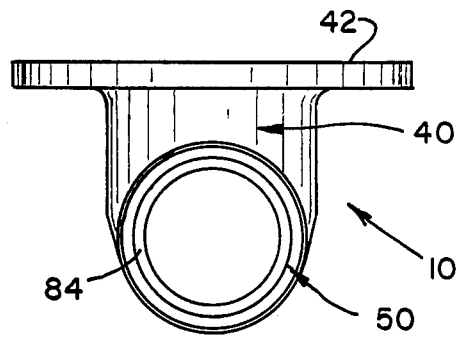
FIG. 15 is an end elevational view of the cast hopper tee with inner molded lining.
Figure 16:
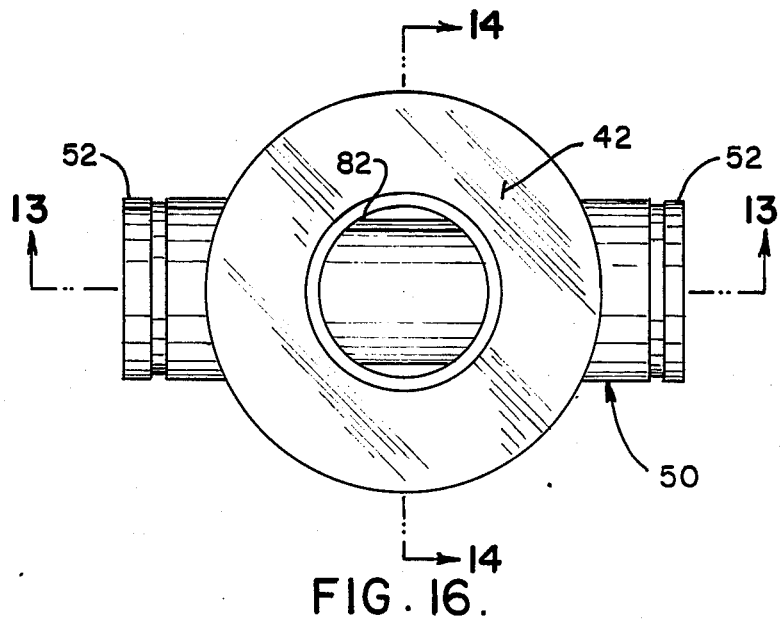
FIG. 16 is a top plan view of the cast hopper tee with inner molded lining.

Before discussing the specific construction and advantageous features of the cast hopper tee 10 of the present invention, reference is made to the prior art hopper tees shown in FIGS. 10-12 of the drawings, in order to understand the problems of prior art constructions which the present invention has overcome. These prior art hopper tees generally identified at 20 in FIGS. 10-12 as Prior Art illustrations include a generally vertically directed hollow pipe section 22 having a laterally outwardly directed flange 24 at the upper end thereof which is welded to the vertically directed hollow pipe section 22 as at 26. A through passageway or internal cylindrical wall 28 extends through the vertically directed hollow pipe section 26 and the flange 24 for communication with the valve 14, as described above. Attached to the lower end of the generally vertically directed hollow pipe section 22 is a generally transverse or horizontal pipe section 30. Welds 32 attach the generally vertically and horizontally directed hollow pipe sections 22, 30 respectively to one another as illustrated. The generally horizontally extending hollow pipe section 30 includes an internal passageway or cylindrical wall 34 which communicates with the cylindrical wall or passageway 28 of the vertically directed pipe section 22, in order to allow product to be unloaded through the vertically directed pipe section 22 and into the horizontally extending pipe section 30, for pneumatic unloading into the pipeline tubing 18, as discussed above. Thus, the opposite free ends 36, 36 of the horizontally extending hollow pipe section 30 may be attached to the pipeline tubing 18, by way of the pipeline clamps as shown in FIG. 1, for example.

In the prior art construction, attention is particularly invited to FIGS. 11-12 which show the rough and irregular internal wall surfaces as a result of the welds 32 connecting the vertical and horizontally extending pipe sections 22, 30 to one another. For all of the reasons previously set forth in the background description of this invention, the prior art constructions of hopper tees 20 have proved to be undesirable and not advantageous, particularly in light of the construction and features of the cast hopper tee 10 of the present invention.

Reference is now made to FIGS. 2-7 of the drawings for a description of the construction of the integral one-piece cast hopper tee 10 of the present invention. The cast hopper tee 10 includes a first hollow pipe section 40 having a laterally outwardly directed flange 42 at an upper end thereof for attachment to the bottom of the valve 14, or directly to the hopper 12, as may be desired. The first hollow pipe section is generally vertically directed and includes an internal cylindrical wall 44 of predetermined internal diameter. The sides of the internal cylindrical wall 44 of the first hollow pipe section 40 may be varied to suit the hopper size, in the particular environment in which it is to be used.

A second hollow pipe section 50 extends generally transverse relative to the first hollow pipe section 40 and is integrally attached thereto at a lower end thereof. The second hollow pipe section 50 is generally horizontally directed and extends on opposite sides of the first hollow pipe section 40 terminating at opposite free ends 52, 52 for attachment to the pipeline tubing 18, as shown in FIG. 1, by any suitable means as desired.

Other than being cast as an integral one-piece cast hopper tee 10, preferably of aluminum, the construction and configuration of the aforementioned components of the cast hopper 10 are similar to the prior art hopper tee 20, previously described. However, the manner in which the first and second hollow pipe sections 40, 50 are integrally joined together in the one-piece construction of the present invention is specifically different from the aforementioned prior art construction, as will now be described.

Figures 2, 3:
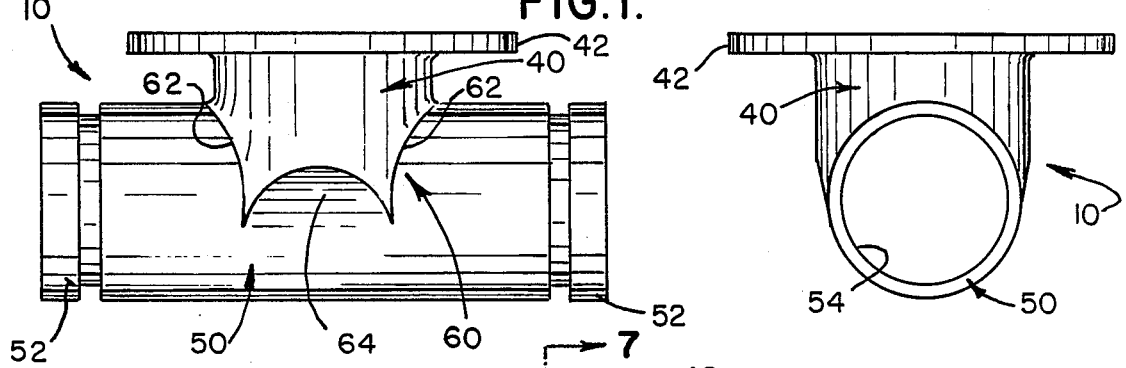
FIG. 2 is a side elevational view of the integral one-piece cast hopper tee of the present invention.
FIG. 3 is an end elevational view of the cast hopper tee.
Figure 6:
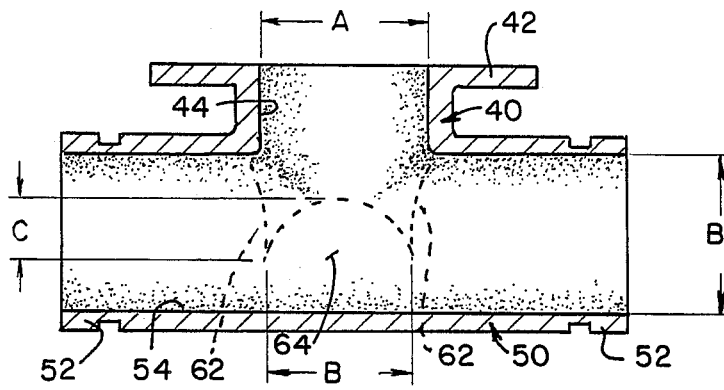
FIG. 6 is a side sectional view of the cast hopper tee along lines 6—6 of FIG. 4.
Figure 7:
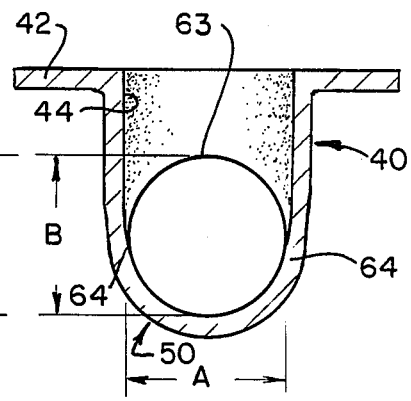
FIG. 7 is an end sectional view of the cast hopper tee as along lines 7—7 of FIG. 4.

As specifically and distinctly different from the aforementioned prior art constructions, an area of juncture 60 being the first and second hollow pipe sections 40, 50 respectively has smooth and uninterrupted internal transitional surfaces which permit complete and continuous flow of product discharged from the hopper 12 into the first hollow pipe section 40, in order to allow product to flow without impedance into the second hollow pipe section 50 and then through the pipeline tubing 18. This area of juncture 60 between the first and second hollow pipe sections 40, 50 respectively includes first opposed internal curvilinear surfaces 62, 62 as best seen in FIG. 6 of the drawings. Each of the first opposed internal curvilinear wall surfaces 62, 62 extend from an uppermost inner midpoint 63, as seen in FIG. 7, of the second hollow pipe section 50 and curve a predetermined distance downwardly and inwardly on opposite sides of the uppermost inner midpoint 63 along the internal cylindrical wall 54 of the second hollow pipe section 50. These downwardly and inwardly curving opposed internal curvilinear wall surfaces 62, 62 extend transversely across the second hollow pipe section 50 as seen in FIGS. 2 and 6. The area of juncture 60 further includes second opposed internal curvilinear wall surfaces 64, 64 on opposite sides thereof which extend generally along the second hollow pipe section 50 for a predetermined distance and merge with outermost portions of the first opposed internal curvilinear wall surfaces 62, 62, in order to provide the smooth and uninterrupted internal transitional surfaces.

Figure 4:
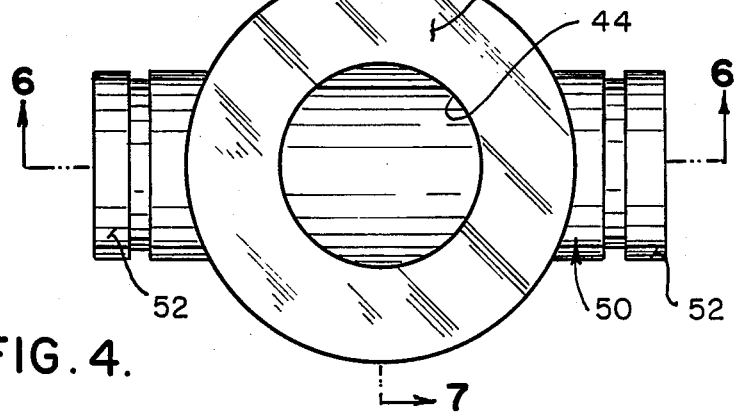
FIG. 4 is a top plan view of the aforementioned cast hopper tee.
Figure 5:
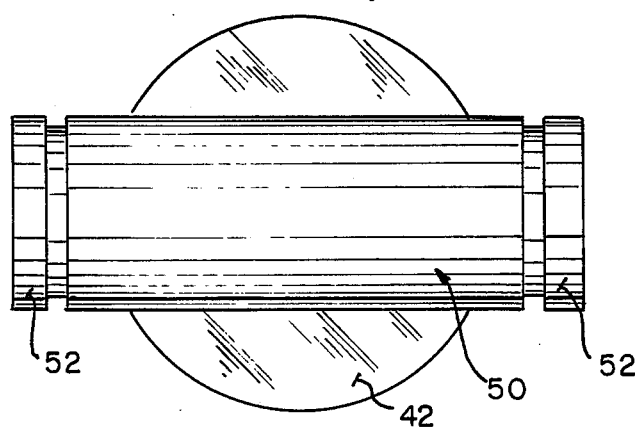
FIG. 5 is a bottom plan view of this same cast hopper tee.

Thus, as can be seen from the top plan view of the cast hopper 10 in FIG. 4 of the drawings and from the sectional views thereof as shown in FIGS. 6 and 7 as viewed along line 6—6 and line 7—7 of FIG. 4, the smooth and uninterrupted internal transitional surfaces in the area of juncture 60 between the first and second hollow pipe sections 40, 50 respectively permits complete and continuous flow of product through the cast hopper tee 10.

In FIG. 6—7 of the drawings, the predetermined internal diameter A of the internal cylindrical wall 44 of the first hollow pipe section 40 is larger than the predetermined internal diameter B of the internal cylindrical wall 54 of the second hollow pipe section 50. Furthermore, the predetermined internal diameter in the area of juncture 60 between the first and second hollow pipe sections 40, 50 respectively is substantially the same as the predetermined internal diameter A of the first hollow body section 40. This can be best understood by comparing the predetermined internal diameter A in FIG. 6 of the drawings, as taken along line 6—6 of FIG. 4, which is along the longitudinal extension of the second pipe section 50, and comparing the predetermined internal diameter A in FIG. 7 of the drawings where the opposed internal curvilinear wall surfaces 64, 64 in the area of juncture 60 provide the same predetermined internal diameter A as the first hollow body section 40. Therefore, unlike the prior art constructions of FIGS. 10–12, the area of juncture 60 between the first and second hollow pipe section 40, 50 respectively provides the smooth and uninterrupted internal transitional surfaces which are necessary for smooth product flow without contamination, as compared with the prior art constructions.

It will be further noted that each of the second opposed internal curvilinear wall surfaces 64, 64 extend both circumferentially and longitudinally along said second hollow pipe section and define opposed semi-cylindrical curvilinear wall surfaces or sections 63, 64 in the area of juncture 60. These semi-cylindrical curvilinear wall surfaces or sections 64, 64 are provided approximately 90° offset from the upper innermost midpoint 64 of the second hollow pipe section, as best shown in FIG. 7. As further shown in FIG. 6, the approximately longitudinal length of the semi-cylindrical sections is shown by the same dimension B as the predetermined internal diameter B of the internal cylindrical wall 54 of the second hollow pipe section. It will also be seen that the height C of the semi-cylindrical sections or wall surfaces 64, 64 along the circumferential extent of the second hollow pipe section 50 is approximately one-half of the longitudinal length B of the semi-cylindrical sections 64, 64.

Thus, since the largest internal diameter A of the internal cylindrical wall of the first hollow section 40 is also the same internal diameter in the area of the juncture 60, along the first internally opposed and second internally opposed curvilinear wall surfaces 62, 62 and 64, 64 respectively, which is within the confines of the internal cylindrical wall 54 of the second hollow pipe section 50, smooth and uninterrupted internal transitional surfaces in the area of juncture 60 will, therefore, be provided. That is why in viewing the internal transitional surfaces from the top plan view of FIG. 4, and also from the sectional views of FIG. 6 and 7 as viewed along line 6—6 and line 7—7 of FIG. 4, there is nothing to restrict the flow of the product or to provide irregular surfaces for contamination of product flowing through the cast hopper tee 10.

Figure 8:
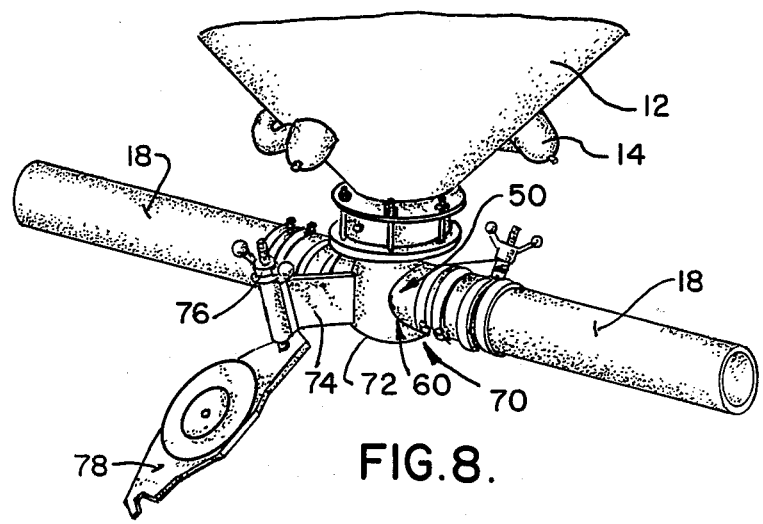
FIG. 8 is a fragmentary isometric view of another embodiment of the cast hopper tee permitting gravity flow through/bottom unloading.
Figure 9:
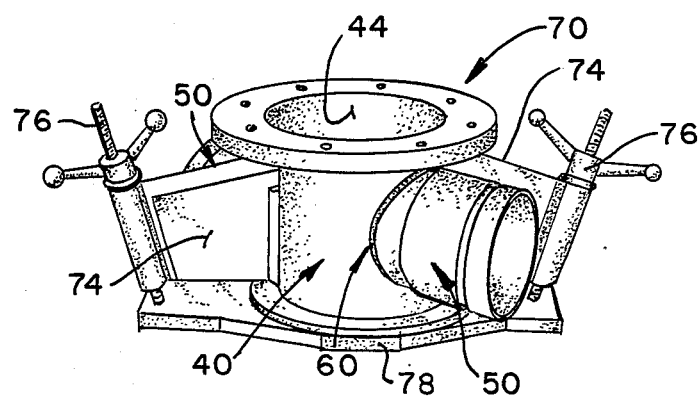
FIG. 9 is an enlarged isometric view of the cast hopper tee embodiment shown in the FIG. 8 environment.

Referring now to another embodiment of the present invention, reference is made to FIGS. 8–9 of the drawings. There, it will be seen that the cast hopper tee 70 is modified to provide an extension of the first hollow pipe section, which extends below the second hollow pipe section 50 and has a flow through opening 72 therethrough that communicates with the internal cylindrical wall 44 of the first hollow pipe section 40. Attached to the first hollow pipe section 40 and extending radially outwardly therefrom are a pair of opposed arms 74, 74 which support through the threaded fasteners 76, the separate swing-away door 78 which is mounted to the lower end of the first hollow pipe section 40, for closing off the flow through opening 72. According to the FIGS. 8–9 embodiment, when it is simply desired to provide a gravity flow of the product in the hopper 12 through the first hollow pipe section 40, the swing-away door 78 is disposed as shown in FIG. 8, thereby allowing the product to flow therethrough for deposit at a desired location.

Also, as in the FIGS. 1–7 embodiment, the area of juncture 60 between the first and second hollow pipe sections 40, 50 respectively have smooth and uninterrupted internal transitional surfaces which provide complete and continuous flow of product discharged from the hopper 12 and into the first pipe section 40, in order to allow product to flow without impedance into the second hollow pipe section and then through the pipe line tubing. Because the first hollow pipe section 40 is larger than the second hollow pipe sections 50 in the FIGS. 8–9 embodiment, the specific shape and configuration of the area of juncture 60 in this embodiment will be different than in the FIGS. 1–7 embodiment; however, because the first and second hollow pipe sections 40, 50 are integrally cast as a one-piece unit, it will be understood that the smaller second hollow pipe sections 50 along the internal area of juncture 60 with the first hollow pipe section 40 will provide smooth and uninterrupted internal transitional surfaces therethrough.

Reference is now made to FIGS. 13–16 of the drawings which show the cast hopper tee 10, as constructed in accordance with FIGS. 1 through 7 of the drawings, and further including an inner molded lining 80. Specifically, the inner molded lining 80 is preferably made from a urethane elastomer that is molded in-situ within the cast hopper tee 10, which is preferably cast aluminum. A supplemental mold, of both vertical and horizontal segments, is located within the hollow pipe sections 40 and 50, respectively, and then the urethane is injection molded in place. This provides a very smooth transitional liner between these pipe sections, and prevents the hang up of any ingredient during flowage from any associated hopper, through the tee, and to discharge. The lining 80 includes a vertically directed wall portion 82 which is integrally molded and connected to the horizontally directed wall portion 84 and including corresponding inner wall portions 86 which conform to the internal cylindrical wall of the first and second hollow pipe sections 40, 50 respectively, including the smooth and uninterrupted internal transitional surfaces 60.

The urethane elastomeric lining 80 provides not only a low coefficient of friction, but it has good abrasion resistance with good load bearing characteristics. When used with a cast aluminum hopper tee 10, the resulting product is a lighter cast hopper tee having an inner molded lining 80 that offers high abrasion resistance. Such a product provides abrasion resistance equal to or better than Schedule 80 heavy steel, which is typically used for sand hauling applications, and yet the resulting product is a much lighter cast hopper tee, with greater payload, and thus extremely beneficial to users.

In view of the above, it will be seen that the several objects of the invention are achieved and other advantageous results are obtained.

As various changes could be made in the above constructions without departing from the scope of the invention, it is intended that all matter contained in the above description are shown in the accompanying drawings shall be interpreted as illustrative and not in a limiting sense.

Having thus described the invention what is claimed and desired to be secured by letters patent is:

1. An integral one-piece cast hopper tee comprising:
   a first hollow pipe section having a laterally outwardly directed flange at an upper end thereof for attachment to the bottom of a hopper, said first hollow pipe section having an internal cylindrical wall of predetermined internal diameter;
   a second hollow pipe section extending generally transversely relative to said first hollow pipe section and being integrally attached through casting to the first hollow pipe section at a lower end thereof, said second hollow pipe section extending on opposite sides beyond the first hollow pipe section, and terminating at opposite free ends for attachment to pipeline tubing, said second hollow pipe section having an internal cylindrical wall approximately of the same predetermined internal diameter as the said first hollow pipe section;
   the area of cast at the juncture between the first and second hollow pipe sections having smooth and uninterrupted internal transitional surfaces including first opposed internal curvilinear surfaces which merge into second opposed curvilinear wall surfaces, each of said first opposed internal curvilinear wall surfaces extending from an uppermost inner midpoint of said second hollow pipe section and curving a predetermined distance downwardly and inwardly on opposite sides of said midpoint along the internal cylindrical wall of the second hollow pipe section and extending transversely across the second hollow pipe section, said second opposed internal curvilinear wall surfaces extending generally longitudinally along said second hollow pipe section for a predetermined distance and merging with outermost portions of the first opposed internal cylinder wall surfaces, with said area of juncture providing smooth and uninterrupted internal transitional surfaces permitting complete and continuous flow of product discharged from the hopper into the first hollow pipe section in order to allow the product to flow without impedance into the second hollow pipe section and then through the pipeline tubing, said second opposed internal curvilinear wall surfaces extending both circumferentially and longitudinally along said second hollow pipe section and defining semi-cylindrical sections intersecting said first and second hollow pipe sections in the area of juncture thereof, said opposed semi-cylindrical sections provided in said second hollow pipe section disposed approximately ninety degrees offset from the uppermost inner midpoint thereof, the approximate longitudinal length of said semi-cylindrical sections being generally the same as the predetermined internal diameter of the internal cylindrical wall of said second hollow pipe section, and wherein the height of the semi-cylindrical sections along the circumferential extent thereof being approximately one-half of the longitudinal length of said semi-cylindrical sections.

2. The invention of claim 1 and wherein said second hollow pipe section having an internal cylindrical wall of smaller predetermined internal diameter than said first hollow pipe section.

3. The invention of claim 1 and including said second hollow pipe section having a flow-through opening at a lower end thereof corresponding to the internal cylindrical wall of said first hollow pipe section, and a separate swing-away door mounted to the lower end of said first hollow pipe section for closing off said flow-through opening and capable of being swung out of the way to enable product from the hopper to be discharged through the first hollow pipe section past the flow-through opening by gravity flow.

4. The integral one-piece hopper tee as defined in claim 1 and including an inner molded lining having a low-coefficient of friction which conforms to the internal cylindrical walls including the smooth and uninterrupted internal transitional surfaces of said first and second hollow pipe sections.

5. The integral one-piece cast hopper tee as defined in claim 4 wherein said inner molded lining is made from a urethane elastomer and said cast hopper tee is made from aluminum.

6. The integral one-piece cast hopper tee as defined in claim 1 and including an inner molded lining made from a urethane elastomer, and said cast hopper tee being made from aluminum.

* * * * *